No. 699,853. Patented May 13, 1902.
R. C. SEYMOUR.
ANTI-OFFSET DEVICE.
(Application filed Dec. 10, 1901.)
(No Model.)

Witnesses:
George Barry Jr
Henry Thieme

Inventor:
Ralph C. Seymour
By attorneys
Brown & Seward

THE NORRIS PETERS CO., PHOTO-LITHO., WASHINGTON, D. C.

UNITED STATES PATENT OFFICE.

RALPH C. SEYMOUR, OF SOUTH ORANGE, NEW JERSEY, ASSIGNOR TO C. B. COTTRELL & SONS COMPANY, OF NEW YORK, N. Y., A CORPORATION OF NEW JERSEY.

ANTI-OFFSET DEVICE.

SPECIFICATION forming part of Letters Patent No. 699,853, dated May 13, 1902.

Application filed December 10, 1901. Serial No. 85,351. (No model.)

*To all whom it may concern:*

Be it known that I, RALPH C. SEYMOUR, a citizen of the United States, and a resident of South Orange, in the county of Essex and State of New Jersey, have invented a new and useful Improvement in Anti-Offset Devices, of which the following is a specification, reference being had to the accompanying drawings.

This invention is applicable to folding-machines of various kinds; and it consists in the novel combination of wiping-rollers and operating mechanism therefor with such of the rollers of a machine as receive any offset and the novel means for cleaning such wiping-rollers hereinafter described and claimed.

The accompanying drawings illustrate the application of the invention to that class of machine which comprises two turners or half-formers.

Figure 1:
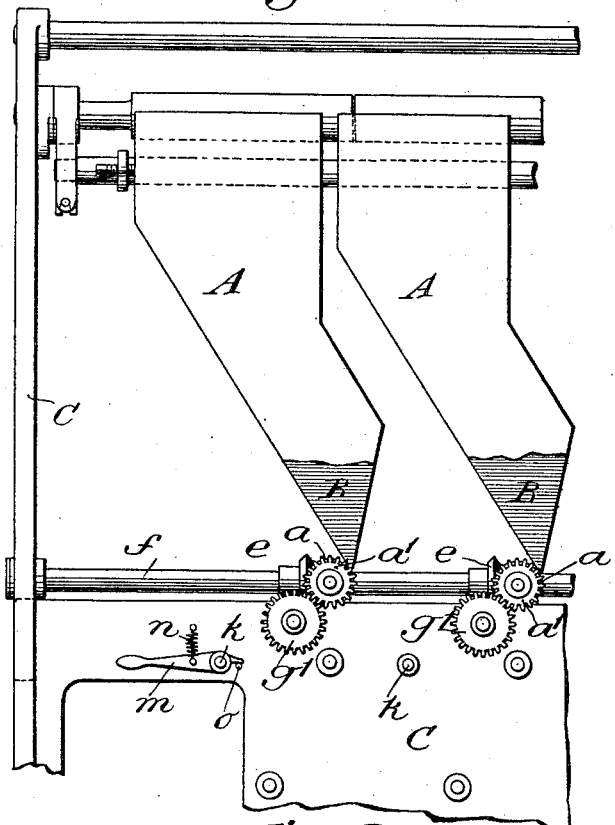
Figure 2:
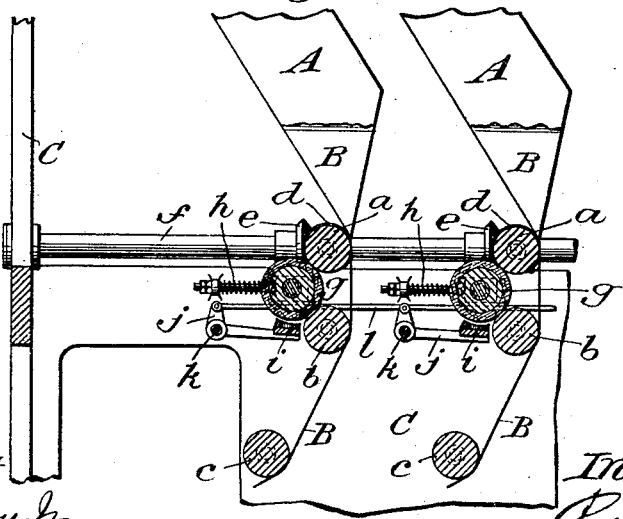

Figure 1 represents a front elevation of as much of such a machine as is necessary to the explanation of the invention; Fig. 2, a sectional view parallel with Fig. 1.

A A designate the two turners.

$a\ b\ c$ are rollers for each turner over or in contact with which the webs B pass in succession from the turner. The rollers $a\ b$ are those which receive the offset and to which my invention is applied and all run in suitable bearings in or on the framing C of the machine. The rollers $a$ are furnished with bevel-gears $d$, through which they are driven by bevel-gears $e$ on a shaft $f$, which may be driven by any suitable means. The rollers $b$ may be driven in any suitable manner at the same surface velocity as $a$. For the rollers $a\ b$ of each turning device there is provided a wiping-roller $g$, which is covered with felt or other soft material. The journal-boxes of the wiping-rollers $g$ are so arranged and have springs $h$ so applied to them that each of said rollers is in contact with both of its respective rollers $a\ b$ and held there by a suitable pressure. The said rollers $g$ are furnished with spur-gears $g'$, to be driven from the rollers $a$ by spur-gears $a'$ on the latter. These spur-gears are so proportioned to the circumferences of the rollers $a\ b$ and that of $g$ that the surface velocity of $g$ may be slightly less or greater than that of $a$ and $b$, and hence that the wiping action of $g$ may be produced by their rotation.

In order to provide for the cleaning of the wiping-rollers by the removal from their surfaces of the offset-printing ink which they have accumulated from the rollers $a\ b$, I provide brushes $i$, of which one is represented for each wiping-roller, the said brushes being carried by elbow-levers $j$ on rock-shafts $k$, which are arranged parallel with the rollers in bearings in the framing C. The levers $j$ for the several brushes are connected by a rod $l$, so that all the brushes may be moved together toward and from their respective wiping-rollers by means of a hand-lever $m$ on one of the rock-shafts. A spring $n$, applied to this hand-lever, as shown in Fig. 1, holds said lever against a fixed stop $o$ on the framing, and so holds all the brushes normally just out of contact with their respective wiping-rollers until an attendant upon the machine presses down the said hand-lever and brings the brushes into contact with the said rollers for the purpose of brushing off the latter by their rotation. This operation is repeated from time to time as often as may be necessary for the removal of accumulations of offset-ink from the rollers.

What I claim as my invention is—

1. The combination with a roller in contact with which a printed web passes, of a soft-surfaced roller in contact with the first-mentioned roller for taking the offset therefrom, a brush and a lever by which said brush is carried for taking it into and out of contact with said soft-surfaced roller, substantially as and for the purpose herein described.

2. The combination with a roller in contact with which a printed web passes, of a soft-surfaced roller in contact with the first-mentioned roller for taking the offset therefrom, a brush normally out of contact with said soft-surfaced roller, and means for bringing said brush from time to time in contact with said soft-surfaced roller, substantially as herein described.

3. In a folding-machine, the combination of a plurality of folding or turning devices each for folding or turning a printed web, offset-receiving rollers in contact with which severally the printed webs pass, soft-surfaced wiping-rollers one for each folding or turning device in contact with its offset-receiving roller or rollers, rock-shafts and attached cleaning-brushes one for each of said wiping-rollers, connections between said rock-shafts and means applied to one of said rock-shafts for placing the several brushes together into and out of contact with their respective wiping-rollers, substantially as herein described.

In testimony that I claim the foregoing as my invention I have signed my name, in presence of two witnesses, this 5th day of December, 1901.

RALPH C. SEYMOUR.

Witnesses:
FREDK. HAYNES,
HENRY THIEME.